United States Patent [19]

Harding

[11] 4,354,180

[45] Oct. 12, 1982

[54] ELECTRO-OPTICAL LIQUID LEVEL SENSOR

[75] Inventor: Robert C. Harding, Dallas, Tex.

[73] Assignee: Genelco, Inc., Dallas, Tex.

[21] Appl. No.: 218,454

[22] Filed: Dec. 19, 1980

[51] Int. Cl.³ ............................................. G08B 21/00
[52] U.S. Cl. ................................... 340/619; 250/577; 73/293; 340/514; 340/641
[58] Field of Search ................. 340/619, 618, 641, 514, 340/515, 516; 250/577, 574, 575; 73/293

[56] References Cited

U.S. PATENT DOCUMENTS

| | | | |
|---|---|---|---|
| 3,120,125 | 2/1964 | Vasel | 250/577 |
| 3,384,885 | 5/1968 | Forbush | 340/619 |
| 3,448,616 | 6/1969 | Wostl et al. | 250/577 |
| 3,553,666 | 1/1971 | Melone | 340/619 |
| 3,882,887 | 5/1975 | Nekai | 340/619 |
| 4,134,022 | 1/1979 | Jacobsen | 340/619 |
| 4,155,013 | 5/1979 | Spiteri | 340/619 |

Primary Examiner—Gerald L. Brigance
Attorney, Agent, or Firm—Cushman, Darby & Cushman

[57] ABSTRACT

A low liquid level electro-optical probe is made self-checking by providing the same with means for intercepting a portion of the usual light beam and constantly reflecting such portion to the usual receiving electro-optical transducer to constantly generate a low level electrical signal even when the probe is wet. Means are provided for boosting the signal to activate an alarm, failure of which will be indicative of failure or malfunctioning of one or more elements of the system.

11 Claims, 8 Drawing Figures

ELECTRO-OPTICAL LIQUID LEVEL SENSOR

THE FIELD OF THE INVENTION

This invention relates to liquid level sensing devices. Many applications of such devices require them to be able to fully check their working functions when in their normal state, i.e., sensor wet or sensor dry. This invention relates more especially to electro-optical low liquid level sensing devices which are fail-safe and are self-checking or self-monitoring to readily determine whether all of the elements thereof are operable.

BACKGROUND OF THE INVENTION

Liquid level electro-optical sensing devices are well known. They operate on the principle of different indices of refraction between the transparent body of a probe and a gaseous medium above the liquid, normally air. Such probe bodies are provided with an optically polished exterior surface area upon wich a light beam is shined from the interior of the body. When the surface area is exposed to the gaseous medium, i.e., air, the light beam is reflected from the surface area interiorly of the body and the reflection shines upon a receiving electro-optical transducer to develop an electrical signal. On the other hand, when the reflecting area is immersed in the liquid, the light beam exits the body through the area without appreciable reflection so that the electro-optical transducer develops no electrical signal. The presence or absence of such a signal indicates whether the probe reflecting area is dry or wet, i.e. immersed in the liquid. Such devices are used as high liquid level alarms and low liquid level alarms. When used as a high liquid level alarm, the probe surface reflecting area normally is not immersed in the liquid, and when used as a low liquid level alarm, usually is immersed in the liquid.

When the probe is used as a high liquid alarm, the reflecting area normally is dry so that the light circuit to the receiving transducer normally is completed and an electrical signal normally is developed. This enables the system to be readily self-checked or self-monitored, and to be fail-safe, because interruption of the signal while the probe surface area is dry, i.e., its normal state, will indicate that one or more elements of the system are not functioning properly. On the other hand, when such a device is used as a low liquid level alarm so that the reflecting area is normally immersed in the liquid, and consequently the light circuit normally is interrupted because the light beam exits from the body, the system is not readily susceptible to self-checking or self-monitoring and is not normally fail-safe because the electro-optical transducer does not normally develop an electrical signal. Thus, the failure of any one of the elements of the system interrupts no signal.

Solutions to the problem of making high liquid level electro-optical sensing device, self-checking or fail-safe under any conditions are known. For example, the patent to Perren, U.S. Pat. No. 4,201,914, May 6, 1980, shows an electro-optical liquid level sensing device which employs an infrared source that is cyclically-modulated in a self-monitoring mode to cause the system to oscillate. Another patent to Jacobsen, U.S. Pat. No. 4,134,022, Jan. 9, 1979, discloses a comparable fail-safe device which uses a light source of a predetermined frequency. The disclosures of both of these patents, however, relate to high liquid level sensing devices where the problem of self-monitoring under normal conditions does not exist.

SUMMARY OF THE INVENTION

Accordingly, it is an object of this invention to provide an improved, inexpensive, relatively simple, low liquid level electro-optical sensing device which is fail-safe and self-checking in its normal condition.

The foregoing object is accomplished by the modification of a conventional electro-optical probe to incorporate means for continuously reflecting a portion, and transmitting the balance, of the usual light beam to the wet or dry sensing reflective exterior surface area of the probe. In other words, the invention provides an uninterrupted light circuit for a portion of the beam. The beam portion so continuously reflected is picked up by the usual receiving electro-optical transducer to develop a low level electrical signal that is fed to circuitry to produce a constant low level output signal that is insufficient to activate a load, e.g., an alarm, a relay or the like. When the output signal is increased, however, by exposure of the reflective surface area to air and thus reflecting substantially the entire beam to the receiving transducer, the load, i.e. the alarm is activated. The circuitry includes adjustable means for selectively increasing the level of the output signal response to the reflected beam to activate the load. On such increase, if the load is not activated, it will be an indication of failure of one or more elements of the system.

Other objects and advantages of the invention will become apparent from the following description and accompanying drawings in which:

BRIEF DESCRIPTION OF THE DRAWINGS

FIG. 6 is a schematic illustration of the probe and system shown in FIG. 3 with additional circuitry for automatically self-checking the system.

THE PRIOR ART

Figure 1:
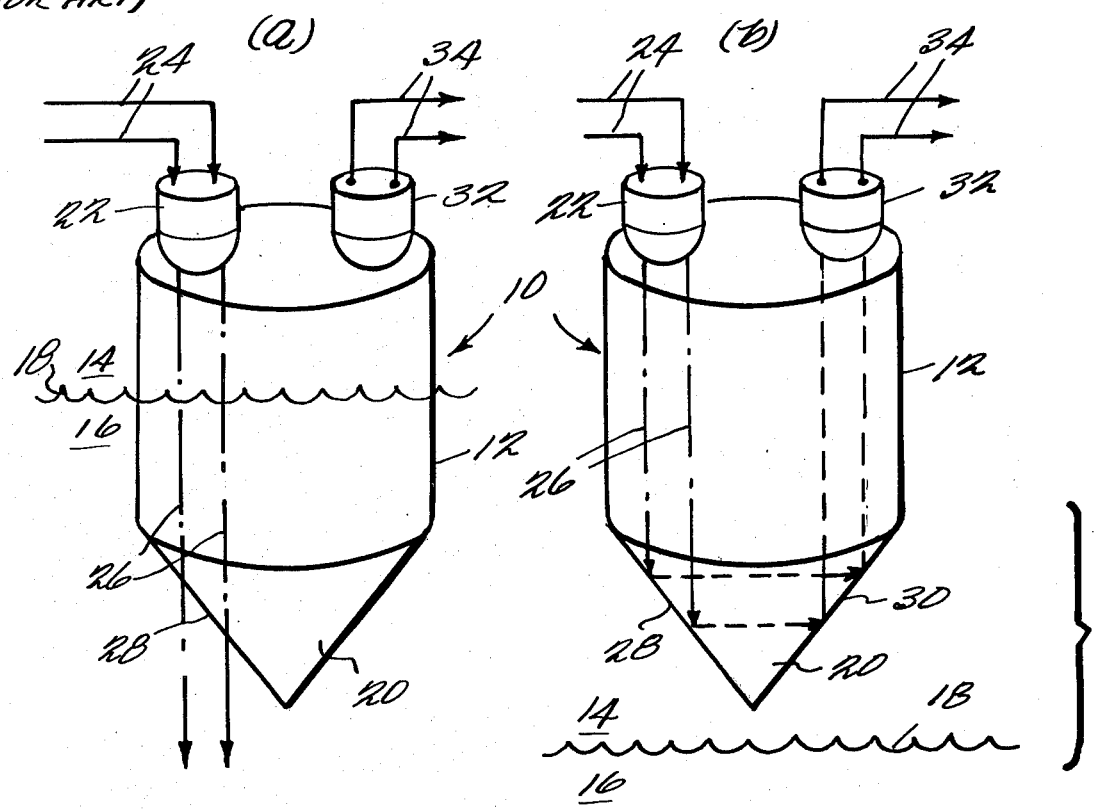
FIGS. 1a and 1b are schematic illustrations of prior art electro-optical liquid level sensors.

Referring now to FIGS. 1a and 1b of the drawings, there is shown therein the general principles involved in prior art electro-optical liquid level sensing devices. These include a probe 10 in the form of a transparent body 12 of material having an index of refraction larger than that of the dry medium 14, usually air, above the liquid 16, the level 18 of which is to be sensed. Normally, the index or refraction of the body 12 is about equal to, but not much larger than the index of refraction of the liquid 16. For illustrative purposes, the body 12 is shown in the form of an upright cylinder, although many other shapes can be and have been employed. The lower end of the body 12 terminates in a cone 20 forming an optically polished exterior surface that presents an angle of incidence to light rays directed thereonto from the interior of the body parallel to the axis thereof that is small enough so that the rays will be reflected internally when the medium exteriorly of the surface has an index of refraction significantly smaller than that of the liquid, the level of which is to be sensed.

Thus, at the upper end of the body 12 there is provided an electro-optical transducer 22, e.g., a lamp, a light emitting diode, a laser diode, etc., receiving current through electrical conductors 24 to develop a light beam 26 (shown in dot-dash lines in FIGS. 1a and 1b) directed downwardly through the body 12 parallel to but offset laterally from its axis upon an area 28 of the polished conical reflective surface 20. When the area 28 is dry, i.e., above the level 18 of the liquid 16, as shown in FIG. 1b, most of the light of the beam 26 will be reflected (as shown by the dash lines in FIG. 1b) from the area 28 interiorly or internally of the body 12 at right angles to and diametrically across the axis of the body onto another reflective area 30 of the conical surface 20 and then reflected therefrom upwardly parallel to but on the other side of the axis from the beam 26 to a receiving electro-optical transducer 32, e.g., a photo diode, a photo transistor, a photocell, etc., to develop an electrical signal which is transmitted via the conductors 34. On the other hand, when the surface 20 is immersed in a liquid having index of refraction about equal to or not much less than that of the body 12, most of the light of the beam 26 from the electro-optical transducer 22 will not be reflected interiorly of the body from the surface area 28 but will pass therethrough and exit from the body into the liquid 16 (as shown by the dot-dash lines in FIG. 1a) so that essentially, the light circuit through the body from the transducer 22 to the transducer 32 interrupted and no electrical signal is generated.

Figure 2:
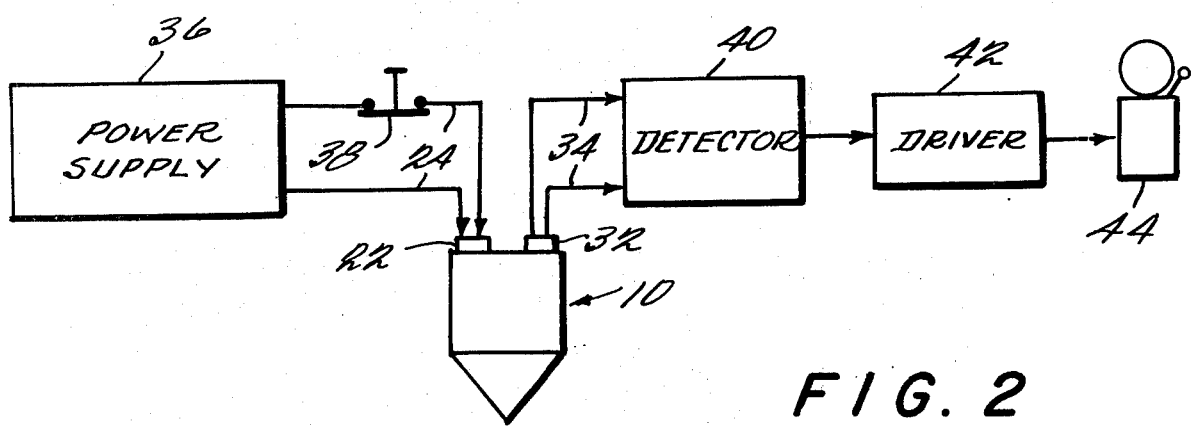
FIG. 2 is a schematic diagram of a typical prior art electro-optical high liquid level alarm system.

When the aforedescribed device is used as a high liquid level sensor, the area 28 normally is dry, as shown in FIG. 1b, so that the light circuit is uninterrupted and the conductors 34 constantly transmit an electrical signal. In this mode the device is self-checking or self-monitoring and essentially fail-safe. On the other hand, when the device is used as a low liquid level sensor, the area 28 normally is wet, as shown in FIG. 1a, so that the light circuit is interrupted and no electrical signal is generated. In this mode, the device is not fail-safe or self-monitoring. Thus, as shown in FIG. 2, the sensor probe 10 is shown connected into the usual system for a high-level alarm. This includes a source of power 36 for the light-beam-producing electro-optical transducer 22, a normally-closed test switch 38 in one of the conductors 24, a detector 40 for ascertaining the presence or absence of an electrical signal through the conductors 34, and driver means 42 responsive to the detector 40 for activating a load, e.g., a relay or an alarm 44, such as a bell, a horn a lamp or the like. When the system is used as a high liquid alarm, and the light circuit normally is completed, interruption of the power source 36, by the test switch 38, will simulate high liquid level and failure of activation of the alarm 44 will indicate failure of one or more elements, 24, 22, 32, 34, 40, 42, 44 of the system. On the other hand, where the system is used as a low liquid level alarm, the surface area 28 normally is immersed in the liquid so that the light circuit normally is interrupted and no sigal is generated. In this mode, opening the test switch 38 will not simulate a low liquid level condition which normally would activate the alarm 44 and failure of activation would indicate failure of at least one element of the system.

DETAILED DESCRIPTION OF THE INVENTION

Figure 3:
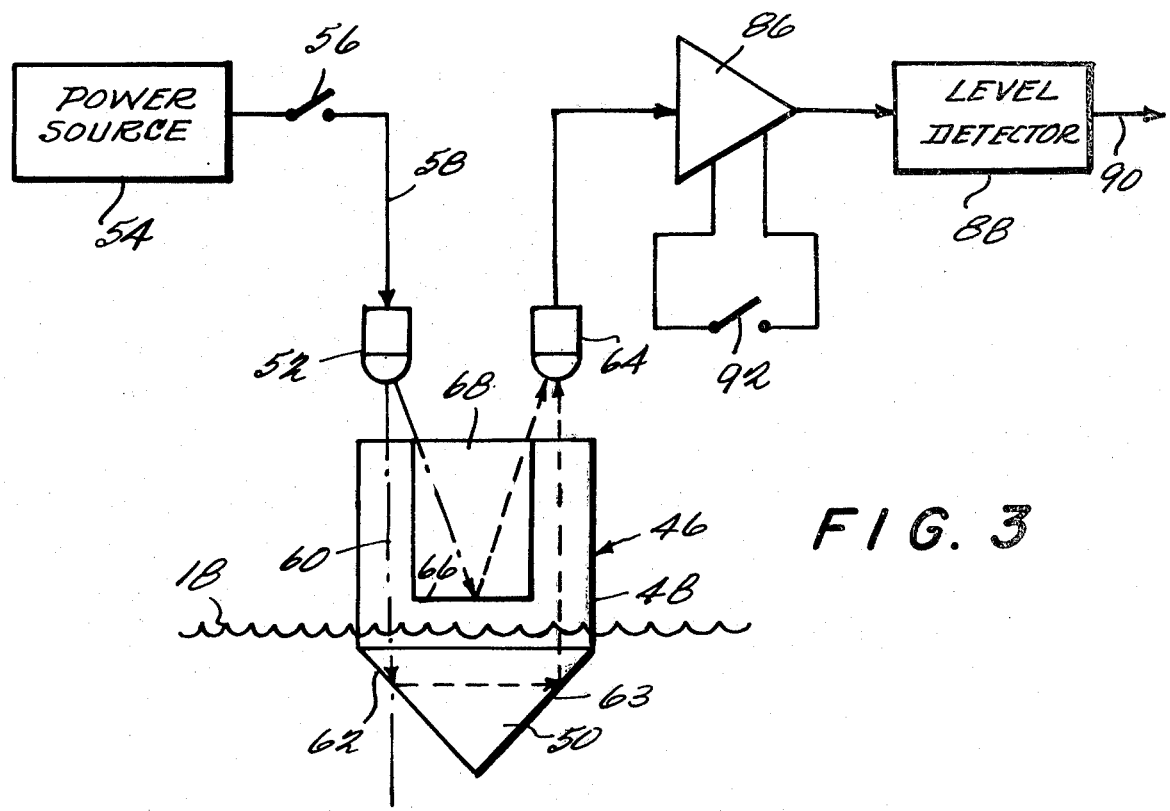
FIG. 3 is a schematic illustration of an electro-optical low liquid level sensing probe and alarm system embodying this invention.

Referring now to FIG. 3, however, there is shown an electro-optical low liquid level alarm system and a sensor device embodying this invention which is fail-safe and which enables the system to be checked readily to ascertain whether one or more elements thereof have or have not failed. For this purpose there is provided a probe 46 having the usual transparent body 48, here shown for exemplary purposes only as being in the shape of an upright cylinder of transparent material terminating, at its lower end, in an optically polished exterior conical surface 50. The body 48 has an index of refraction larger than air but about equal to, but not much larger than, that of the liquid to be sensed. An electro-optical transducer 52 powered by a source 54 having a test switch 56 in the conductors 58, generates a light beam 60 focused downwardly into the body parallel to but offset from the axis thereof, as shown in dot-dash lines, onto an area 62 on the conical surface 50. Diametrically offset from the transducer 52 is a receiving electro-optical transducer 64 positioned to receive light from the beam 60 reflected internally by the areas 62 and 63, as indicated by the dash lines in FIG. 3. As described above with respect to FIGS. 1a and 1b, when the surface 50 is dry, the light beam 60 is continuously reflected to the receiving transducer 64, as shown, but when the area 50 is immersed in the liquid, the level of which is to be sensed, the light circuit is interrupted because the light beam 60 from the transducer 52 passes through the surface area 62 and exits from the body 48 without substantial reflection to the transducer 64.

In accordance with this invention, however, the body 48 is provided with means for constantly reflecting a portion of the light beam 60 from the transducer 52 back to the receiving transducer 64, irrespective of whether the surface 50 is dry or immersed in the liquid, the level of which is to be sensed. Thus, the invention provides an uninterrupted light circuit from transducer 52 to transducer 64 for a portion of the light beams 60. The constant reflection of a portion of the light beam 60 causes the receiving transducer 64 to constantly generate a low level electrical signal, even when the surface 50 is immersed in the liquid. The signal from the transducer 64 is transmitted to circuitry for activating a load, e.g., an alarm, when the level of the signal is high and indicates that the surface 50 is dry. The circuitry is not responsive to the constant low level signal, however, so that the load will not be activated when the surface 50 is wet. The circuitry can be adjusted, however, as detailed hereinafter, to increase the level of the low level signal sufficiently to activate the alarm and its failure of activation will indicate failure of one or more elements of the system.

The constant reflecting means may take many forms. As shown in FIG. 3, it may be an optically-polished bottom surface 66 of a recess 68 in the top of the probe 46, which is like that illustrated in FIGS. 1a and 2a. The surface 66 is positioned to interrupt a portion of the light beam 60 generated by the transducer 52 and to directly and constantly reflect that portion to the receiving transducer 64, as shown. In this arrangement, the recess 68 in and the surface 66 of the probe body 48 are readily sealed off and isolated from the interior of any liquid container where the sensor is installed.

Hence, the surface 66 is adapted to be readily isolated from contact by the liquid, the level of which is being sensed. In this embodiment, it also will be noted that both the intercepted and reflected portions of the beam 60 do not travel through the body of the probe.

Figure 4A:
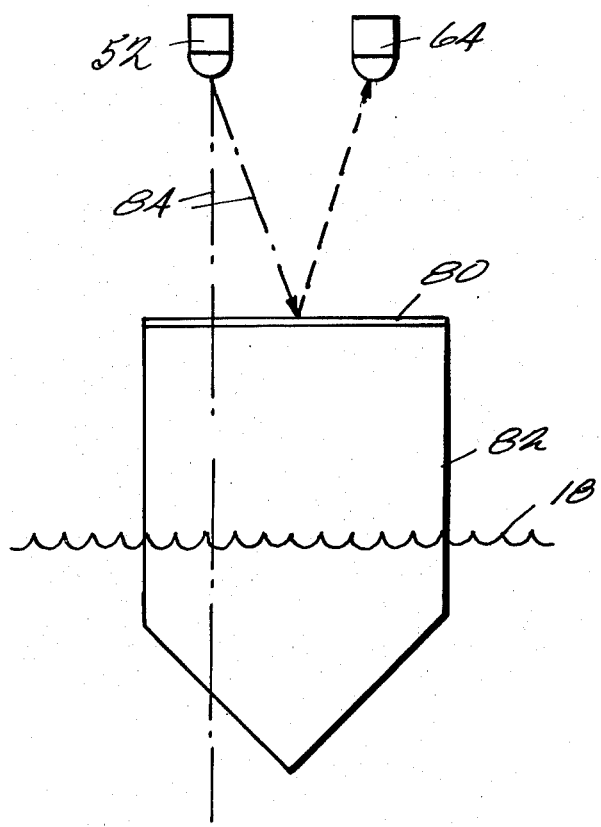
FIG. 4 is a schematic illustration of a modified form of probe embodying this invention.
Figure 4B:
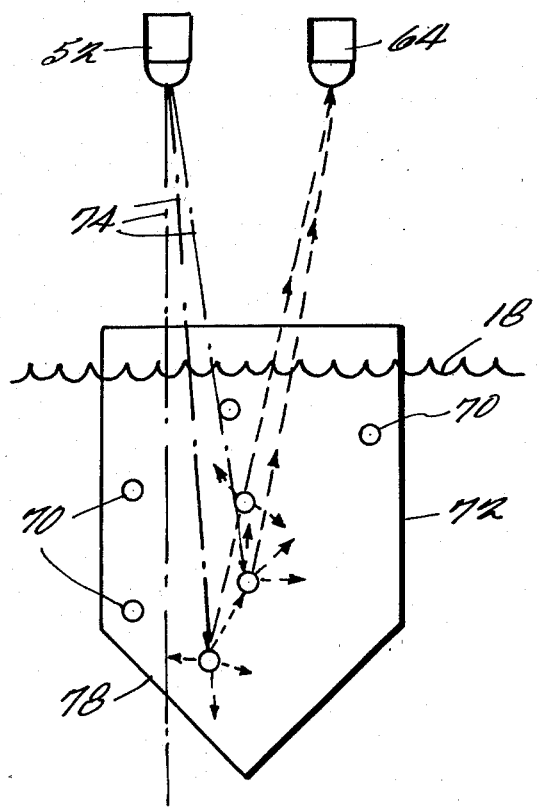

The constant reflecting means could be provided, however, by means other than the surface 66, as by a foil disc, a pigmented residue, a specially textured surface of the body, etc.. Further, the constant reflecting means could be located at places other than the axial location of the surface 66. Additionally, instead of being singular, the constant reflecting means could be plural, e.g., small bubbles or finely divided impurities to be distributed uniformly throughout the interior of a probe body 72, as shown in FIG. 4B. These would cause a scattering of a portion of a beam 74, but would reflect a portion to a receiving electro-optical transducer 64 and allow the balance of the beam to be directed onto an internally reflective surface area 78. The constant reflecting means also could be in the form of a continuous partially reflecting film 80 at the surface of the probe body 82 where the beam 84 enters, as shown in FIG. 4A.

The circuitry for processing the constantly reflected portion of the light beam 60, 74 or 84, as well as the remaining portion reflected interiorly in the dry condition of the probe, can also take many forms. For example, as shown in FIG. 3, it may include an adjustable-gain amplifier 86, having a normal gain less than, equal to or more than unity, for the signal generated by the receiving transducer 64 and a level detector 88 for the output of the amplifier. The level detector 88 yields an output, via conductors 90, indicative of probe condition, i.e., wet or dry, and normally activates a load (not shown), e.g., an alarm, when the probe is dry, as shown in FIG. 3. The level detector 88 is such that the constant low level signal generated by the constant reflection of a portion of the light beam 60 is insufficient to cause the detector to cross the wet/dry threshold and have an output indicative of a dry state. The amplifier 86 is provided with a normally-closed gain switch 92, however, which when open increases the gain to such an extent that the level detector 88 crosses the wet/dry threshold and has an output indicative of a dry condition, thus activating the alarm. Hence, for test purposes, the switch 92 can be opened and if the alarm fails to activate, such failure will be indicative of failure of one or more components of the system. Closing the switch 92 restores the system to its normal "wet" or "dry" sensing function.

Figure 3A:
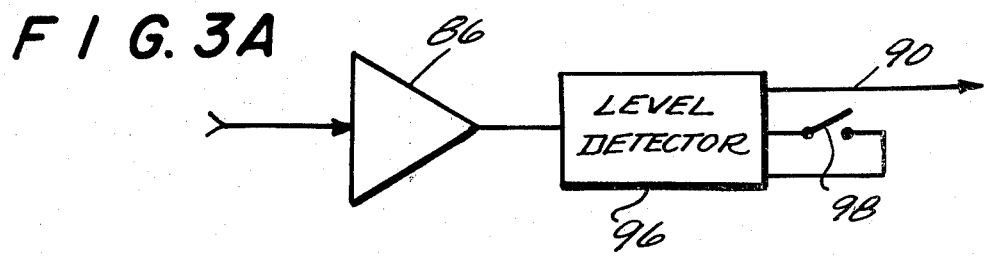
FIG. 3A is a schematic illustration of a modified form of circuitry for use in the system shown in FIG. 3.

Instead of adjusting amplifier gain, the level detector can be adjustable to vary its threshold values. FIG. 3A sows such an arrangement wherein the signal from an amplifier 86 is fed to a level detector 96 having its threshold value adjustable by a switch 98. In some cases the amplifier 86 may be omitted and the signal from the receiving transducer 64 fed directly to the detector 96. In any event, the normal output of the level detector 96 when the probe 46 is wet is insufficient to activate the load even though the constant reflecting means causes the receiving transducer 64 to constantly generate a low level electrical signal. When the detector threshold level is changed, however, by operation of the switch 98, the threshold is crossed and inactivation of the alarm is indicative of failure of one or more components of the system.

Figure 3B:
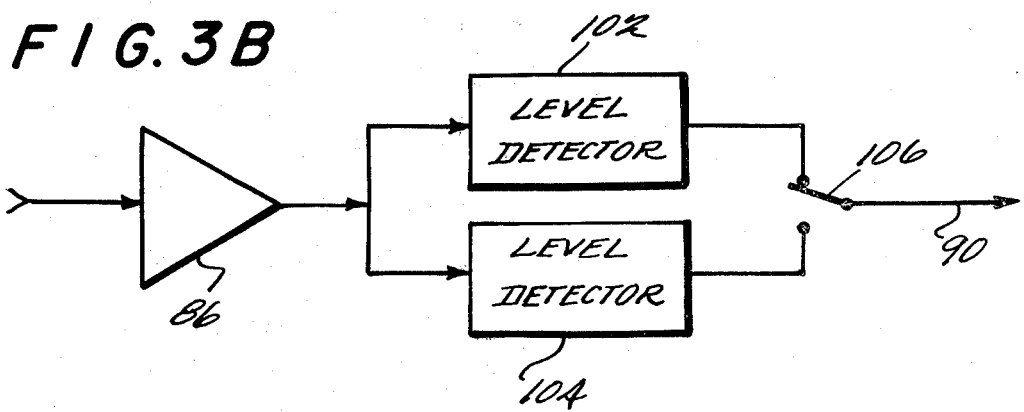
FIG. 3B is a schematic illustration of another modified form of circuitry for use in the system shown in FIG. 3.

A further modified form of the invention is shown in FIG. 3B wherein the signal from the receiving transducer 64 is fed directly to, or through an amplifier 86, to two level detectors 102, 104 having different threshold values for creating an output indicative of wet or dry condition of the probe 72. One detector 102 has a threshold value indicative of a dry condition only when the level of the input signal is above the constant low level signal generated by the constant reflecting means. The other detector 104 has a threshold value indicative of a dry condition even though the level of the input signal is the same as or less than that of the constant low level signal. A switch 106 in either the input conductors or output conductors, as shown, connects the load alternatively to one or the other of the detectors 102, 104. In its normal level sensing condition, the detector 102 is connected to the load by the switch 106, but for checking purposes the detector 104 is connected into the system by the switch 106. In the latter condition, inactivation of the load is indicative of failure of one or more components of the system.

Although the above description implies manual operation of the switches 56, 92, 98, and operator observation of resultant outputs, a fully automatic, almost fail-safe, self-checking system can be provided by periodic operation of such switches by a timing device while observing output according to the following truth table:

| SELF-CHECK TRUTH TABLE | | | | |
|---|---|---|---|---|
| Power Switch 56 | Gain Switch 92 | Output 90 | Self-Checking Output 112 | Alarm 114 |
| Normal (closed) | Normal (closed) | X | No | No |
| Activated | Normal | "dry" | Yes | Yes |
| Activated | Normal | "wet" | Yes | No |
| Normal (closed) | Activated | "dry" | Yes | No |
| Normal (closed) | Activated | "wet" | Yes | Yes |

Figure 5:
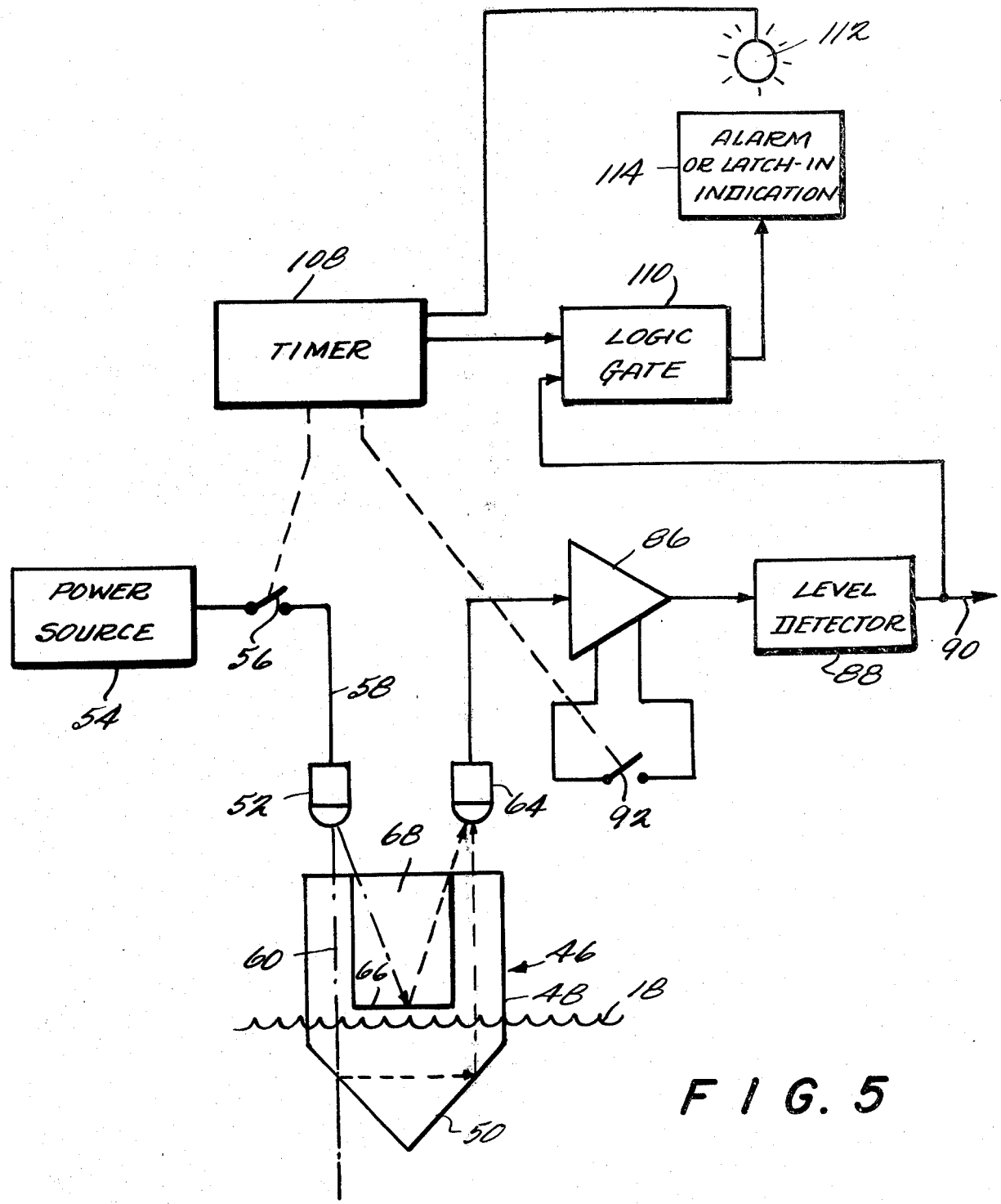
FIG. 5 is a schematic illustration of another modified form of probe embodying this invention.

Such a system is shown in FIG. 5. The system includes timer means 108 for periodically operating the switches 56, 92 in the two sequences listed in the table for other than the normally closed conditions of both switches. The system also includes a truth table logic gate 110 connected for sequential operation to the timer means 108 and also to receive the output signal of the detector 88. The timing means 108 also is connected to an appropriate signal 112, e.g., a lamp, to indicate when the system is in the self-checking mode, i.e., when the switches are in one of the two self-checking conditions.

When the timing means 108 periodically opens the power switch 56 so that no signal is fed to the amplifier 86, there should be no output from the detector 88 which is indicative of the normally wet condition of the probe 46. On the other hand, if there is an output indicative of a dry condition, the output is fed to the logic gate 110 and activates an alarm or a latch-in indicator 114 to show a malfunctioning of one or more of the elements of the system beyond the power switch.

When the timing means 108 periodically opens the switch 92 to increase the gain of the amplifier, if all the elements of the system are functioning properly, the resulting positive output of the detector, indicative of the normally-wet state of the probe, is fed to the logic gate 110 and the alarm or latch-in indicator 114 will not be activated. On the other hand, if opening of the switch 92 results in no output from the detector, indicative of a wet state of the probe, the logic gate 110 activates the alarm or latch-in indicator 114 to show failure or malfunctioning of one or more of the elements of the system.

It thus will be seen that the objects and advantages of this invention have been fully and effectively achieved. It will be realized, however, that the foregoing specific embodiments have been disclosed only for the purpose of illustrating the principles of this invention and are susceptible of modification without departing from such principles. Accordingly, the invention includes all emmbodiments encompassesd within the spirit and scope of the following claims.

I claim:

1. A fail-safe self-checking electro-optical low liquid level sensor, comprising:
   a probe including a transparent body having an index of refraction larger than that of the dry medium above the liquid to be sensed but not appreciably larger than that of the liquid and also having an exterior surface area causing internal reflection therefrom, to a location for sensing by an electro-optical transducer, of a light beam shined on said surface area from the interior of said body when said surface area is immersed in the dry medium but causing exit of the beam from said body through said surface area when the latter is immersed in the liquid, and said body being provided with optically reflective means for intercepting a portion of said beam and constantly reflecting such portion to said location irrespective of whether said exterior surface area is immersed in the dry medium or in the liquid.

2. The sensor defined in claim 1 wherein the optically reflective means comprises an exterior surface area of the body constantly exposed to the dry medium.

3. The sensor defined in claim 1 wherein the optically reflective means comprises material different from that of the body.

4. The sensor defined in claim 1 wherein the optically reflective means comprises finely divided means distributed substantially uniformly throughout the interior of the body.

5. The sensor means defined in claim 1 wherein the optically reflective means comprises a partially reflecting film on a surface area of the body through which the beam enters said body.

6. The sensor defined in claim 1 including:
   an electro-optical transducer at the location for receiving substantially the entire reflection of the beam and converting it to a proportional electrical signal;
   electrical circuitry means for receiving said signal and normally operable to activate an alarm only when the surface area is immersed in the dry medium; and
   means for adjusting said circuitry to activate the alarm when the signal is generated only by the constantly reflected portion of the light beam, activation then indicating proper functioning of said sensor.

7. The sensor defined in claim 6 in which the circuitry includes an amplifier for the signal and an electrical level detector for receiving the output of said amplifier; and the adjusting means comprises means for adjusting the gain of said amplifier.

8. The sensor defined in claim 6 in which the circuitry comprises an adjustable electrical level detector.

9. The sensor defined in claim 6 including:
   two electrical level detectors having different outputs; and
   means for selectively connecting one or the other of said detectors into the circuitry.

10. The sensor defined in claim 6 including:
    an electro-optical transducer for generating the light beam;
    power switching means for said transducer;
    timing means for periodically sequentially opening said switching means, then closing said switching means and simultaneously adjusting the circuitry to activate the alarm, and then adjusting the circuitry to deactivate the alarm;
    electrical logic gate means for receiving the output of said circuitry and operable by said timing means; and
    malfunction indicator means operable by said gate means, whereby when said switching means is open or is closed and the circuitry is adjusted to activate the alarm activation of said indicator means indicates a malfunction.

11. The sensor defined in claim 1, including means operable by the timing means periodically with its sequential operation of the switching means and circuitry adjustment to indicate that the sensor is in a self-checking mode.

* * * * *